(No Model.)

S. GRIM.
THILL COUPLING.

No. 600,780. Patented Mar. 15, 1898.

Witnesses
Harry L. Amer.
T. L. Mockabee

Inventor
Simon Grim.
by W. D. Stockbridge
his Attorney

UNITED STATES PATENT OFFICE.

SIMON GRIM, OF ST. PHILIP, INDIANA.

THILL-COUPLING.

SPECIFICATION forming part of Letters Patent No. 600,780, dated March 15, 1898.

Application filed October 2, 1897. Serial No. 653,902. (No model.)

*To all whom it may concern:*

Be it known that I, SIMON GRIM, residing at St. Philip, in the county of Posey and State of Indiana, have invented certain new and useful Improvements in Thill-Couplings; and I do hereby declare the following to be a full, clear, and exact description of the invention, such as will enable others skilled in the art to which it appertains to make and use the same.
This invention relates to certain new and useful improvements in thill-couplings, the object of the same being to provide a simple and cheaply-constructed device of this character whereby thills may be readily, conveniently, and quickly attached to or detached from a vehicle and also readily propped in a raised position.

The invention consists in a clip adapted to embrace and be secured to the front axle of a vehicle, a coupling-block secured to or formed integral with said clip and extending forwardly therefrom, the said block having a rectangular slot or opening therein with a concave rear side and a transverse bearing in advance of said concave side, a thill-iron having a hook upon its rear end adapted to fit within the opening in said block and engage the bearing at the rear thereof, and a specific form of spring having a downwardly-extending arm adapted to engage the upper side of the thill-iron and constituting a flexible fulcrum therefor.

The invention also consists in other details of construction and combinations of parts, which will be hereinafter more fully described and claimed.

Figure 1:
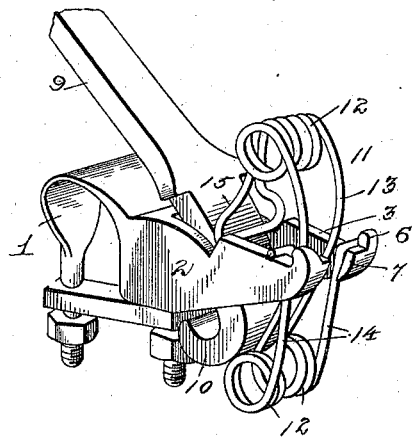
Figure 2:
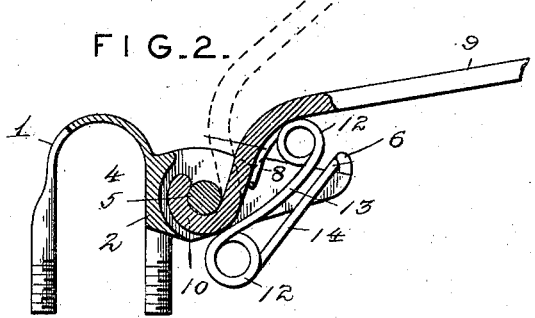
Figure 3:
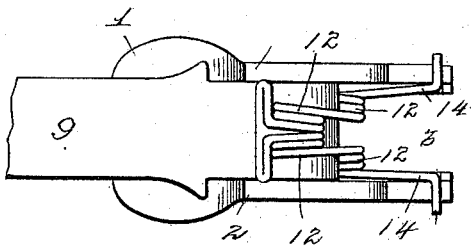

In the drawings forming a part of this specification, Figure 1 represents a perspective view of the improved coupling. Fig. 2 is a vertical longitudinal section through the same, showing the thill fitting therein in full lines in operative position and in dotted lines in its raised position. Fig. 3 is a top plan view of the same, and Fig. 4 is a detail perspective view of the spring for holding the thill-iron in place in the coupling-block.

Similar numerals of reference are employed to indicate corresponding parts in the several views.
The clip 1 is of the usual form of construction and adapted to embrace the axle of a vehicle and be secured in place thereon by means of nuts upon the lower threaded ends of the two arms of said clip. Secured to or formed integral with the clip 1 is a forwardly-extending coupling-block 2, having a rectangular slot or opening 3 therein, with inclined forward edges and a concave rear wall 4, in advance of which is a transverse bearing 5, sufficient space being left between the bearing and the said rear concave wall to permit the attachment of the thill end. The opposite portions of the block at the front ends have upwardly-projecting ears 6 and inwardly-extending retaining-lugs 7, and in rear of the ears the upper edges of the opposite portions are recessed, as at 8, the front portions of said recesses being straight and angularly disposed and the rear portions gradually curved. These recesses form seats for a portion of the spring, which will be presently described.

Figure 4:
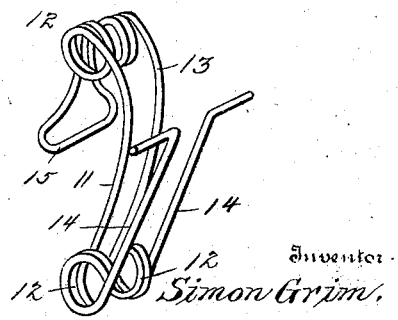

The thill-iron 9 is connected to the thill or shaft in the usual manner and has a hook 10 at its rear end which is adapted to engage the transverse bearing 5 in the block 2, sufficient space being left between the end of the hook and the adjacent portion of the thill-iron to permit the disengagement of the thill-iron from the transverse bearing when desired. The concave wall 4 of the coupling-block permits an easy movement of the hooked end of the thill-iron, and when the transverse bearing is engaged by the said thill-iron the fitting is somewhat snug to avoid too loose play. Ftting within the slot 3 of the coupling-block 2 is a spring 11, which is clearly shown in detail in Fig. 4 of the drawings. This spring is formed of two coils 12 at the upper and lower portions thereof, and from the center of the lower coil arms 13 extend upwardly and are formed into the upper coil. The outer ends of the lower coil are also projected upwardly in the form of legs 14, which bear against the retaining-lugs 7 and at their free ends are bent outwardly to take against the ears 6. From the center of the upper coil an arm 15 extends downwardly and is in the form of a loop to provide an extended bearing-surface and rests on the thill-iron to exert a tension sufficient to prevent rattling and likewise to obviate the rising of the thill beyond a predetermined distance, and the thill-iron if forced upwardly will be resisted by the tension of the said spring.

As shown in Fig. 2 in dotted lines, the thill may be raised when not in use and held in an uplifted position, and in this arrangement the hooked end of the thill-iron is disconnected from the transverse bearing and will shut downwardly, the spring being caused to change its position, so that the arm 15 will be brought to bear in the recesses at 8 in the upper edge of the coupling-block, and the lower hooked ends of the thill-iron are also in this arrangement brought to bear against the lower coil of the spring. The change of point of bearing of the arm 15 of the spring sustains the thill-iron in elevated position, and as an auxiliary to this retention the lower coil has an important function. In the adjustment of the parts the spring has pivotal movement through the angular portion of the arms engaging the outer parts of the coupling-block, and the ears 6 and lugs 7 prevent the accidental displacement of the spring from its proper position within the said block.

The device is very advantageous in its use and operation and can be readily applied to vehicles as now constructed without any material rearrangement or change of parts, and it is obviously apparent also that many minor changes in the details of construction and arrangement of the device itself might be made and substituted for those shown and described without in the least departing from the nature or spirit of the invention or sacrificing any of the advantages thereof.

Having thus described the invention, what is claimed as new is—

1. In a thill-coupling, the combination of a clip adapted to be secured to the axle of the vehicle and having a coupling-block at the front portion thereof provided with an opening therein across the rear portion of which a transverse bearing extends, of a thill-iron having a rear hooked end to removably engage the said transverse bearing, and a loosely-mounted adjustable spring in the coupling-block in advance of the thill-iron, and provided with a downwardly-extending arm adapted to engage a part of the thill and hold it in elevated position and also constitute a flexible fulcrum for said thill, the said spring being automatically changeable as to its position in the coupling-block, substantially as and for the purposes set forth.

2. In a thill-coupling, the combination with a clip adapted to be secured to the axle of a vehicle, and comprising a coupling-block having an opening therein with a rear concave wall and also provided with a transverse bearing in advance of said wall, and upper recesses and front ears and inwardly-extending lugs, of a thill-iron having a hooked end to removably engage the said transverse bearing, and a spring removably mounted in the said coupling and consisting of upper and lower coils, the lower coil having upwardly-extending arms with angularly-bent ends and engaging the lugs and ears, and the upper coil having a downwardly-extending arm bearing upon the said thill-iron and adapted to engage the recesses in the coupling-block, substantially as described.

3. In a thill-coupling, the combination of a clip having a forwardly-extending coupling-block with recesses therein and a rear transverse bearing, a thill-iron having a hooked end to removably engage the said bearing, and a spring removably mounted in the said coupling-block and having upper and lower coils, the upper coil being provided with a depending arm to engage the thill-iron and act with the lower coil to sustain the thill-iron in raised position, substantially as described.

In testimony whereof I have signed this specification in the presence of two subscribing witnesses.

SIMON GRIM.

Witnesses:
ANTHONY J. KLEIN,
CHARLES E. HILL.